(12) United States Patent
Ahm

(10) Patent No.: US 7,213,366 B1
(45) Date of Patent: May 8, 2007

(54) MIXTURE OF A CARRIER AND ADDITIVES FOR USE IN GERMINATING UNITS CONTAINING SEEDS OR SIMILAR GROWTH-SUITED PARTS OF A PLANTS AS WELL AS A METHOD OF PRODUCING THE MIXTURE

(75) Inventor: Poul Henrik Ahm, Altea (ES)

(73) Assignee: Bentle Products AG, Zug (CH)

( * ) Notice: Subject to any disclaimer, the term of this patent is extended or adjusted under 35 U.S.C. 154(b) by 0 days.

(21) Appl. No.: 09/720,367

(22) PCT Filed: Jun. 23, 1999

(86) PCT No.: PCT/DK99/00350

§ 371 (c)(1),
(2), (4) Date: Dec. 22, 2000

(87) PCT Pub. No.: WO00/00017

PCT Pub. Date: Jan. 6, 2000

(30) Foreign Application Priority Data

Jun. 29, 1998 (DK) ................................ 1998 00839

(51) Int. Cl.
*A01C 1/04* (2006.01)
(52) U.S. Cl. .......................................................... 47/56
(58) Field of Classification Search ................... 47/7, 47/56
See application file for complete search history.

(56) References Cited

U.S. PATENT DOCUMENTS

| 3,728,213 | A | * | 4/1973 | Hinz | 162/161 |
|---|---|---|---|---|---|
| 3,903,816 | A | * | 9/1975 | Brem | 111/130 |
| 4,250,660 | A | | 2/1981 | Kitamura et al. | 47/57.6 |
| 4,786,308 | A | * | 11/1988 | Colling | 71/24 |
| 5,081,791 | A | | 1/1992 | Baron et al. | 47/66 |
| 5,175,131 | A | * | 12/1992 | Lang et al. | 501/84 |
| 5,672,434 | A | * | 9/1997 | Dalebroux et al. | 28/17 |
| 5,866,269 | A | * | 2/1999 | Dalebroux et al. | 28/79 |
| 5,965,149 | A | * | 10/1999 | Silver | 424/405 |
| 6,029,395 | A | * | 2/2000 | Morgan | 47/9 |

FOREIGN PATENT DOCUMENTS

EP 0380448 8/1990

OTHER PUBLICATIONS

Microsoft Bookshelf Basic Dictionary, definition of mineral wool.*

* cited by examiner

*Primary Examiner*—Son T. Nguyen
(74) *Attorney, Agent, or Firm*—Donald S. Dowden; Cooper & Dunham LLP

(57) ABSTRACT

A mixture of a carrier, a binder and additives is used for germinating units containing seeds or the like growth-suited parts of a plant, and the units are available either separately or coherently in form of seed or plant tapes. The carrier comprises one or more substances selected from the group consisting of vermiculite, perlite, zeolite, cellulose materials, burned clay, rock wool or the like substances. The binder comprises polyvinyl alcohol, polyethylene glycol or other plant-compatible binders, such as water or water-containing polysaccharides or mixtures thereof. The additives comprise plant protecting agents, plant nutrients, surfactants, water-absorbing substances, water-carrying substances and other additives with favourable effects on germination and plant growth.

9 Claims, No Drawings

MIXTURE OF A CARRIER AND ADDITIVES FOR USE IN GERMINATING UNITS CONTAINING SEEDS OR SIMILAR GROWTH-SUITED PARTS OF A PLANTS AS WELL AS A METHOD OF PRODUCING THE MIXTURE

TECHNICAL FIELD

The invention relates to a mixture of the type stated in the introductory part of claim 1.

BACKGROUND ART

EP publication No. 0,380,448 discloses a seed pellet comprising a coated seed, where the coating for instance is made of vermiculite, binder, water-absorbing material and additives pressed together about the seed on a pelleting press. The seed pellet is intended to be sowed directly in the field, and nothing is stated about the seed pellet being placed in a small pocket in actual germinating units, neither in separate germinating units nor in germinating units in seed or plant tapes.

EP publication No. 0,260,106 discloses a plant growth medium prepared by mixing vermiculite, perlite and a gel-forming material in water and mixing said mixture with plant nutrients. The mixture is dried and shaped into sheets, pellets, granules or the like comprising seeds. No water-absorbing material is used, and it is not a question of inserting the mixture in pockets in the germinating units either. Being without the water-absorbing material it is no longer certain that sufficient moisture and simultaneously sufficient air exist about the roots of the plant.

EP publication No. 0,373,348 discloses a growth medium for plants. This growth medium comprises for instance a filler, such as vermiculite, perlite and the like together with charcoal or activated carbon plus polyacrylamide (SAP) plus possibly peat moss. The prepared medium does not, however, comprise a binder which can ensure that the polyacrylamide is uniformly distributed in said medium by being adhered to the filler.

None of the above mixtures have a completely satisfying effect in the above germinating units.

BRIEF DESCRIPTION OF THE INVENTION

The object of the invention is to provide a mixture of the above type, which is particularly suited for the above germinating units, and which further is inexpensive and ensures that a seed is provided with a sufficiently high amount of retained water reserve once said seed is placed in the germinating unit, said water reserve being released as required without preventing air from reaching the seed and the roots of the developing plant.

Another object of the invention is to provide a mixture comprising a carrier which in response to specific effects is suited for retaining and releasing both natural and chemical and biological additives of any nature for an adjustment of the germination and growth conditions and for combating diseases and attacks from fungus, virae, bacteria and insects.

The mixture according to the invention is characterised in the features stated in the charaterising part of claim 1.

This mixture turned out in practice to be particularly advantageous because it provides particular good germination and/or growth conditions for the seed, an optimum ratio of air to moisture always applying about the seed and the roots. The use of vermiculite ensures an advantageously high pore volume, which in turn ensures more than 20% by volume of free air and a thorough ion-exchange between $Mg^{++}$ and $Ca^{++}$, which are vital to the life function of the plants.

According to the invention the superabsorbing polymer (SAP) may advantageously for instance be polyacrylamide or crossbound acrylamide/acrylic acid in form of a potassium salt/ammonium salt (Stockosorb 400 K) [Reg. Trade Mark], which represents at least 3% by weight of the mixture in the dry state. This mixture possesses a particularly good water absorption capacity and is able to release the water again by way of osmosis.

Moreover the water-absorbing substance may according to the invention be carboxymethyl cellulose (CMC) representing at least 6 to 20% by weight of the mixture, preferably 8 to 15% by weight. This embodiment is particularly environmentally acceptable.

A particularly good binding of the materials of the mixture without interfering with the granular structure of said mixture is obtained when the binder is a polyvinyl alcohol present in an amount corresponding to 0.1 to 5% by weight of the mixture in the dry state.

An advantage is obtained when the vermiculite is present in a fineness corresponding to 0.5 to 2.5 mm, especially 1.0 to 2.0 mm, and represents 80 to 95% by weight of the mixture in the dry state.

In a preferred embodiment of the mixture the binder is a polyvinyl alcohol present in an amount corresponding to 0.1 to 0.5% by weight of the mixture in the dry state.

A further advantage is obtained when the binder is polyethylene glycol 300 (POLYDIOL) [Reg. Trade Mark] present in an amount of 0.1 to 5% by weight of the mixture in the dry state.

Advantageously the binder may be a polysaccharide present in an amount of 0.1 to 5.0% by weight of the mixture in the dry state.

In a preferred embodiment of the mixture the cellulose materials may be wood fibres or spaghnum.

In a further preferred embodiment the mineral fibres may be rockwool or the like substances.

Advantageously the pesticides may be herbicides.

In a preferred embodiment the insecticides may be systemic insecticides.

In another preferred embodiment the culture of fungi may be a culture of Trichoderma.

In a further preferred embodiment of the mixture the useful insects may be predatory nematodes.

Advantageously the trace element may be molybdenum.

In a preferred embodiment the water absorbing material may be a superabsorbing polymer (SAP) or carboxymethyl cellulose (CMC).

In another preferred embodiment the plant-compatible binder may be water or water with saccharides.

The invention also relates to a method of producing the mixture according to the invention. This method is particularly simple for producing the mixture according to the invention.

In a preferred embodiment of said method the granular size of the pourable granulate is 0.6 to 1.5 mm.

A particularly advantageous embodiment of the method according to the invention is characterised in that at least 0.15 g of an at least 1% aqueous PVA-solution or at least 0.15 g of an at least 1% aqueous polysaccharide solution is used as binder for 1 g of vermiculite.

BEST MODE FOR CARRYING OUT THE INVENTION

The invention is explained below with reference to some Examples.

EXAMPLE 1

A mixture according to the invention was produced by 200 g Stockosorb 400 K (superabsorbing polymer) of a granular size of between 200 and 600μ being mixed with 2.2 g of Trichoderma-spores. This mixture was then mixed with 5 kg of vermiculite of a granular size of 1.0 to 2.0 mm in an agitator for approximately 10 minutes. While the agitator was running, 250 ml of atomized water were then added as binder, said water being fed to the agitator by means of a spray gun in 3 to 4 minutes. Then the agitator ran for another 10 minutes in such a manner that a uniform distribution of the components of the mixture was obtained, the superabsorbing polymer adhering to the vermiculite, whereafter the mixture felt dry and stable. The completed mixture tolerated a dispatch, and it was particularly suited for the germinating units mentioned in the introduction to this description.

EXAMPLE 2

Same procedure as in Example 1 was followed, but here 55 ml of 90% propyl alcohol were used as binder instead of 250 ml of water. Furthermore, the starting mixture comprised a small amount of systemic insecticide in form of GAUCHO (reg. Trade Mark) in addition to Stockosorb and Trichoderma spores. The systemic insecticide was of a very small granular size, almost in form of powder. This mixture provides a particularly good protection against insect attacks on seeds and plants in the above germinating unit.

EXAMPLE 3

Same procedure as in Example 1 was followed, but here a mixture of water with 10% by weight of polysaccharide replaced the 250 ml of water. As a result an improved cohesion was obtained in the completed mixture. The polysaccharide served simultaneously as nutrient for the added culture of fungi, viz. the Trichoderma spores.

EXAMPLE 4

Same procedure as in Example 1 was followed, but here wood fibres of a fibre length of approximately 1 to 3 mm, more specifically lignin fibres were used instead of vermiculite. As a result a particularly inexpensive mixture was obtained.

EXAMPLE 5

Same procedure as in Example 1 was followed, but here 10 kg of mineral fibres (Rockwool, reg. Trade Mark) were used instead of the vermiculite. The size of the fibres was 1 to 5 mm. The starting mixture of Stockosorb and Trichoderma spores was furthermore admixed small amounts of additives comprising molybdenum and a pH-adjusting agent in form of a phosphoric puffer. The completed mixture was particularly suited for germinating units comprising cauliflower seeds.

The term "mineral fibres" is in this case to be construed as rock wool, glass wool and the like substances.

The invention claimed is:

1. A mixture of a carrier and additives for use in germinating units comprising growth-suited parts of a plant, and a binder, wherein:
   the carrier comprises sphagnum and rock wool;
   the binder binds the additives to the carrier;
   the additives comprise Trichoderma, predatory nematodes, fertilizers, molybdenum, and water-absorbing substances of such character and concentration as to be capable of releasing absorbed water through osmosis, wherein water-absorbing substances are selected from the group consisting of polyacrylamide and cross bound acrylamide/acrylic acid in form of a potassium salt/ammonium salt and represent at least 3% by weight of the mixture in dry state;
   one or more of the carrier and additive substances are in microencapsulated form;
   the binder comprises polyvinyl alcohol; and
   the mixture is granulate, comprises granules having a size within the range of 0.3–3.0 mm, and is sufficiently dry to be pourable.

2. A mixture as claimed in claim 1, wherein the water-absorbing substances comprise carboxymethyl cellulose (CMC), and represent at least 6% by weight of the mixture in the dry state.

3. A mixture as claimed in claim 1, wherein the binder comprises a polyvinyl alcohol present in an amount corresponding to 0.1 to 5% by weight of the mixture in the dry state.

4. A mixture as claimed in claim 1, wherein the binder comprises polyethylene glycol 300 present in an amount of 0.1 to 5% by weight of the mixture in the dry state.

5. A mixture as claimed in claim 1, wherein the binder comprises a polysaccharide present in an amount of 0.1 to 5% by weight of the mixture in the dry state.

6. A mixture as claimed in claim 1, wherein the water-absorbing substances are selected from the group consisting of superabsorbing polymer (SAP) and carboxymethyl cellulose (CMC).

7. A method of producing the mixture as claimed in claim 1, comprising mixing the carrier, the binder and the additives in an agitator for at least 30 minutes to form the pourable granulate.

8. A method as claimed in claim 7, comprising making the granular size 0.6 to 1.5 mm.

9. A method of facilitating the germination of growth-suited parts of a plant, comprising the steps of:
   providing growth-suited parts of a plant;
   providing to said parts a granulate mixture of a carrier and additives in the form of microencapsulated granules sufficiently dry to be pourable and having a size within the range of 0.3–3.0 mm;
   providing a binder including polyvinyl alcohol for binding the additives to the carrier; and
   including in the additives water-absorbing substances of such character and concentration as to be capable of releasing absorbed water to said parts through osmosis.

* * * * *